US010216664B2

(12) United States Patent
Lin et al.

(10) Patent No.: US 10,216,664 B2
(45) Date of Patent: Feb. 26, 2019

(54) REMOTE RESOURCE ACCESS METHOD AND SWITCHING DEVICE

(71) Applicant: Huawei Technologies Co., Ltd., Shenzhen (CN)

(72) Inventors: Xinlong Lin, Beijing (CN); Yunwei Gao, Beijing (CN); Bin Huang, Chengdu (CN); Jianfeng Zhan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 47 days.

(21) Appl. No.: 15/460,923

(22) Filed: Mar. 16, 2017

(65) Prior Publication Data

US 2017/0185546 A1 Jun. 29, 2017

Related U.S. Application Data

(63) Continuation of application No. PCT/CN2015/089155, filed on Sep. 8, 2015.

(30) Foreign Application Priority Data

Sep. 16, 2014 (CN) .......................... 2014 1 0471932

(51) Int. Cl.
*G06F 13/00* (2006.01)
*G06F 13/24* (2006.01)
(Continued)

(52) U.S. Cl.
CPC .............. *G06F 13/24* (2013.01); *G06F 12/10* (2013.01); *G06F 13/102* (2013.01);
(Continued)

(58) Field of Classification Search
CPC ........ G06F 13/24; G06F 12/10; G06F 13/102; G06F 13/00; G06F 3/18; G06F 7/14;
(Continued)

(56) References Cited

U.S. PATENT DOCUMENTS 7,609,649 B1 * 10/2009 Bhandari ............ H04L 67/1097
370/252
8,082,387 B2 * 12/2011 Di Zenzo .............. G06F 1/3225
365/185.25
(Continued)

FOREIGN PATENT DOCUMENTS

CN 101163133 4/2008
CN 101520738 A 9/2009
(Continued)

OTHER PUBLICATIONS

Machine Translation and Abstract of Chinese Publication No. CN101163133, Apr. 16, 2008, 30 pages.
(Continued)

*Primary Examiner* — Tim T Vo
*Assistant Examiner* — Kim T Huynh
(74) *Attorney, Agent, or Firm* — Conley Rose, P.C.

(57) ABSTRACT

A remote resource access method and a switching device are provided. According to the remote resource access method, when a computer system access the remote physical resource device, after obtaining a first access message, including a virtual address of a virtual resource device, from a computing node in the computer system, the switching device converts the first access message into a second access message based on a physical address of a physical resource device corresponding to the virtual address of the virtual resource device. Then, the switching device sends the second access message to the remote physical resource device corresponding to the physical address using a network, thereby implementing the data transmission between the local computer system and the remote physical resource device.

20 Claims, 7 Drawing Sheets

(51) Int. Cl.
    *G06F 12/10* (2016.01)
    *G06F 13/10* (2006.01)
    *G06F 13/40* (2006.01)
    *H04L 29/08* (2006.01)
    *H04L 29/12* (2006.01)
(52) U.S. Cl.
    CPC ...... *G06F 13/4022* (2013.01); *H04L 61/2596* (2013.01); *H04L 67/1097* (2013.01); *G06F 2212/65* (2013.01)
(58) Field of Classification Search
    CPC . G06F 9/318; G06F 9/30; G06F 9/302; G06F 7/04
    USPC .............................................. 710/24, 63, 100
    See application file for complete search history.

(56) References Cited

U.S. PATENT DOCUMENTS

| | | | | |
|---|---|---|---|---|
| 9,137,209 | B1* | 9/2015 | Brandwine | H04L 63/0272 |
| 2011/0179214 | A1* | 7/2011 | Goggin | G06F 3/061 |
| | | | | 711/6 |
| 2012/0210169 | A1* | 8/2012 | Coile | G06F 11/2092 |
| | | | | 714/22 |

FOREIGN PATENT DOCUMENTS

| | | |
|---|---|---|
| CN | 102246465 | 11/2011 |
| CN | 102523207 A | 6/2012 |
| CN | 103823638 A | 5/2014 |
| CN | 103986602 A | 8/2014 |
| WO | 2013143121 A1 | 10/2013 |

OTHER PUBLICATIONS

Machine Translation and Abstract of Chinese Publication No. CN102523207, Jun. 27, 2012, 13 pages.
Foreign Communication From a Counterpart Application, PCT Application No. PCT/CN2015/089155, English Translation of International Search Report dated Dec. 1, 2015, 2 pages.
Foreign Communication From a Counterpart Application, PCT Application No. PCT/CN2015/089155, English Translation of Written Opinion dated Dec. 1, 2015, 5 pages.
Foreign Communication From a Counterpart Application, European Application No. 15841487.0, Extended European Search Report dated Jul. 28, 2017, 7 pages.
Machine Translation and Abstract of Chinese Publication No. CN101520738, Sep. 2, 2009, 14 pages.
Machine Translation and Abstract of Chinese Publication No. CN103823638, May 28, 2014, 43 pages.
Machine Translation and Abstract of Chinese Publication No. CN103986602, Aug. 13, 2014, 60 pages.
Foreign Communication From a Counterpart Application, Chinese Application No. 201410471932.4, Chinese Office Action dated Mar. 29, 2018, 7 pages.

* cited by examiner

REMOTE RESOURCE ACCESS METHOD AND SWITCHING DEVICE

CROSS-REFERENCE TO RELATED APPLICATIONS

This application is a continuation of International Patent Application No. PCT/CN2015/089155 filed on Sep. 8, 2015, which claims priority to Chinese Patent Application No. 201410471932.4, filed on Sep. 16, 2014. The disclosures of the aforementioned applications are hereby incorporated by reference in their entireties.

TECHNICAL FIELD

Embodiments of the present disclosure relate to the field of computer technologies, and in particular, to a remote resource access method and a switching device.

BACKGROUND

With continuous development of computer technologies, increasing hardware resources are integrated in a computer system. Because of features of different applications, these hardware resources are in an idle state most of the time, and resource utilization is relatively low.

In some approaches, to increase resource utilization, a computer system separate from an external device and an input/output (I/O) method thereof are applied. A host may communicate in a wired manner or using a wireless network, and I/O operations performed by the host on a remote device are all redirected to an external device of a docking station.

In a process of implementing the increase of resource utilization, the process has the following disadvantages. When a host communicates with a remote physical resource device, a device driver of the host needs to be modified, and the remote physical resource device to be accessed needs to be configured in advance. In addition, in an architecture in the other approaches, the remote physical resource device cannot access the host using an interrupt manner.

SUMMARY

Embodiments of the present disclosure provide a remote resource access method and a switching device in order to implement data transmission between a local computer system and a remote physical resource device.

According to a first aspect, an embodiment of the present disclosure provides a remote resource access method, used to access a physical resource device separate from a computer system, where the computer system includes at least one computing node, and the computer system and the physical resource device are connected using a switching device, and the method includes obtaining, by the switching device, a first access message sent by a computing node, where the first access message is used to access a virtual resource device, and a destination address in the first access message is a virtual address of the virtual resource device, determining a physical address of the physical resource device corresponding to the virtual resource device according to a preset mapping relationship between the virtual address of the virtual resource device and the physical address of the physical resource device, where the virtual resource device is a virtualized device of the physical resource device locally, converting the first access message into a second access message, where a destination address in the second access message is the physical address of the physical resource device, and sending the second access message to the physical resource device using a network, where the physical resource device includes at least one physical resource.

With reference to the first aspect, in a first possible implementation manner, the method further includes obtaining physical resource information allocated by a management platform to the computing node, where the physical resource information includes the physical address of the physical resource device, and the management platform is used to manage the physical resource device separate from the computer system, generating the virtual resource device corresponding to the physical resource device, and recording a mapping relationship between the virtual address of the virtual resource device and the physical address of the physical resource device.

With reference to the first aspect or the first possible implementation manner of the first aspect, in a second possible implementation manner, the method further includes obtaining a first interrupt request sent by the physical resource device to the computing node, where the first interrupt request carries the physical address of the physical resource device, determining the virtual address of the virtual resource device corresponding to the physical resource device according to the preset mapping relationship between the virtual address of the virtual resource device and the physical address of the physical resource device, converting the first interrupt request into a second interrupt request, where the second interrupt request carries the virtual address of the virtual resource device, and sending the second interrupt request to the computing node such that the computing node accesses the virtual resource device according to the second interrupt request.

With reference to the first possible implementation manner of the first aspect, in a third possible implementation manner, generating the virtual resource device corresponding to the physical resource device includes selecting a driver of the physical resource device according to the physical resource information, and simulating, on the switching device, the physical resource device according to the selected driver in order to generate the virtual resource device corresponding to the physical resource device.

With reference to the first aspect, in a fourth possible implementation manner, determining a physical address of the physical resource device corresponding to the virtual resource device according to a preset mapping relationship between the virtual address of the virtual resource device and the physical address of the physical resource device includes retrieving a mapping relationship between the virtual address of the virtual resource device and the physical address of the physical resource device by querying an address conversion table in order to determine the physical address of the physical resource device corresponding to the virtual resource device, where the address conversion table stores the mapping relationship between the virtual address and the physical address.

According to a second aspect, an embodiment of the present disclosure provides a switching device, where the device is configured to access a physical resource device separate from a computer system, the computer system includes at least one computing node, and the computer system and the physical resource device are connected using the switching device, and the device includes a receiving module configured to obtain a first access message sent by a computing node, where the first access message is used to access a virtual resource device, and a destination address in the first access message is a virtual address of the virtual resource device, an obtaining module configured to determine a physical address of the physical resource device corresponding to the virtual resource device according to a preset mapping relationship between the virtual address of the virtual resource device and the physical address of the physical resource device, where the virtual resource device is a virtualized device of the physical resource device locally, a conversion module configured to convert the first access message into a second access message, where a destination address in the second access message is the physical address, and a sending module configured to send the second access message to the physical resource device using a network, where the physical resource device includes at least one physical resource.

With reference to the second aspect, in a first possible implementation manner, the device further includes a physical resource information obtaining module configured to obtain physical resource information allocated by a management platform to the computing node, where the physical resource information includes the physical address of the physical resource device, and the management platform is used to manage the physical resource device separate from the computer system, a generation module configured to generate the virtual resource device corresponding to the physical resource device, and a recording module configured to record a mapping relationship between the virtual address of the virtual resource device and the physical address of the physical resource device.

With reference to the second aspect or the first possible implementation manner of the second aspect, in a second possible implementation manner, the receiving module is further configured to obtain a first interrupt request sent by the physical resource device to the computing node, where the first interrupt request carries the physical address of the physical resource device. The obtaining module is further configured to determine the virtual address of the virtual resource device corresponding to the physical resource device according to the preset mapping relationship between the virtual address of the virtual resource device and the physical address of the physical resource device. The conversion module is further configured to convert the first interrupt request into a second interrupt request, where the second interrupt request carries the virtual address of the virtual resource device, and the sending module is further configured to send the second interrupt request to the computing node such that the computing node accesses the virtual resource device according to the second interrupt request.

With reference to the first possible implementation manner of the second aspect, in a fourth possible implementation manner, the generation module is further configured to select a driver of the physical resource device according to the physical resource information, and simulate, on the switching device, the physical resource device according to the selected driver in order to generate the virtual resource device corresponding to the physical resource device.

With reference to the second aspect, in a fourth possible implementation manner, the obtaining module is further configured to retrieve a mapping relationship between the virtual address of the virtual resource device and the physical address of the physical resource device by querying an address conversion table in order to determine the physical address of the physical resource device corresponding to the virtual resource device, where the address conversion table stores the mapping relationship between the virtual address and the physical address.

According to the remote resource access method and the switching device that are provided in the embodiments of the present disclosure, a virtual address that is of a virtual resource device and that is in a first access message is first converted into a corresponding physical address of a remote physical resource device. Then, a second access message is generated according to the physical address of the remote physical resource device. The second access message is sent to the remote physical resource device corresponding to the physical address using a network. Thus, data transmission between a local computer system and the remote physical resource device can also be implemented without using a driver of the remote physical resource device.

BRIEF DESCRIPTION OF DRAWINGS

To describe technical solutions in the embodiments of the present disclosure more clearly, the following briefly describes the accompanying drawings required for describing the embodiments. The accompanying drawings in the following description show merely some embodiments of the present disclosure.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure.

Figure 1A:
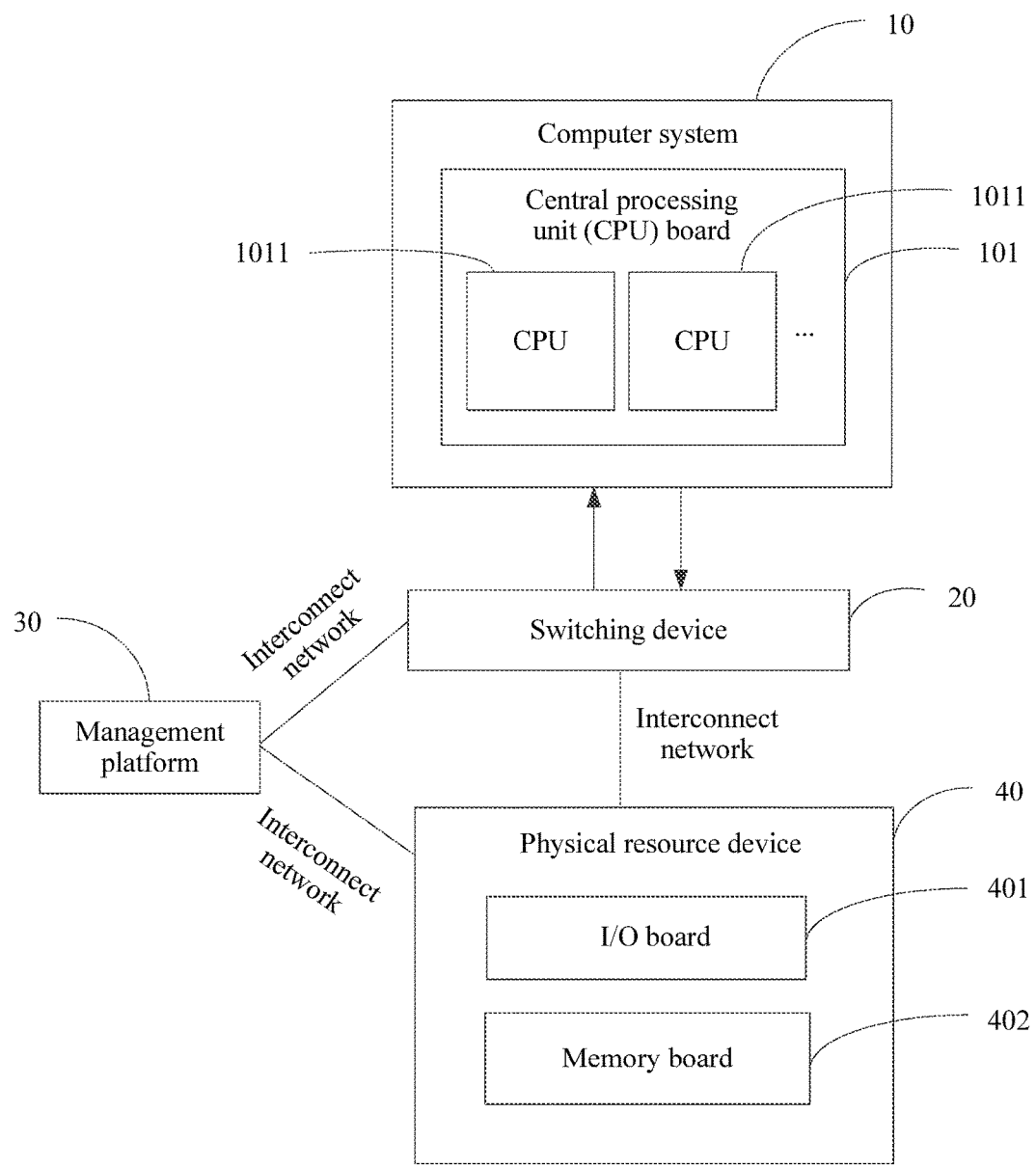
FIG. 1A is a schematic diagram of a remote resource access scenario according to an embodiment of the present disclosure.

An embodiment of the present disclosure provides a remote resource access method, used to access a physical resource device separate from a computer system. As shown in FIG. 1A, FIG. 1A is an application scenario, provided in this embodiment of the present disclosure, in which the computer system is separate from the physical resource device. As shown in the figure, a computer system 10 and a physical resource device 40 are connected using a switching device 20. The computer system 10 may include a Central Processing Unit (CPU) board 101, and the CPU board 101 may include at least one CPU 1011. The switching device 20 and the computer system 10 are located in a same bus architecture, and the switching device 20 may be generally a Peripheral Component Interconnect Express (PCIe) switching device. For example, the switching device 20 may be presented to an operating system in the computer system 10 in a PCIe-switch manner. The switching device 20 and the physical resource device 40 are connected for communication using an interconnect network, and the switching device 20 is configured to be responsible for communication forwarding between the computer system 10 and the remote physical resource device 40. The physical resource device 40 may further include a physical resource, such as memory board 402 and an I/O board 401. A management platform 30 may be connected to the switching device 20 and the physical resource device 40 using interconnect networks. The management platform 30 may be used to manage all resources, store specific information and a usage state of the physical resource device, and the like. For example, the management platform 30 may allocate information about the managed resources to the computer system 10 according to a request of the computer system 10.

Figure 1B:
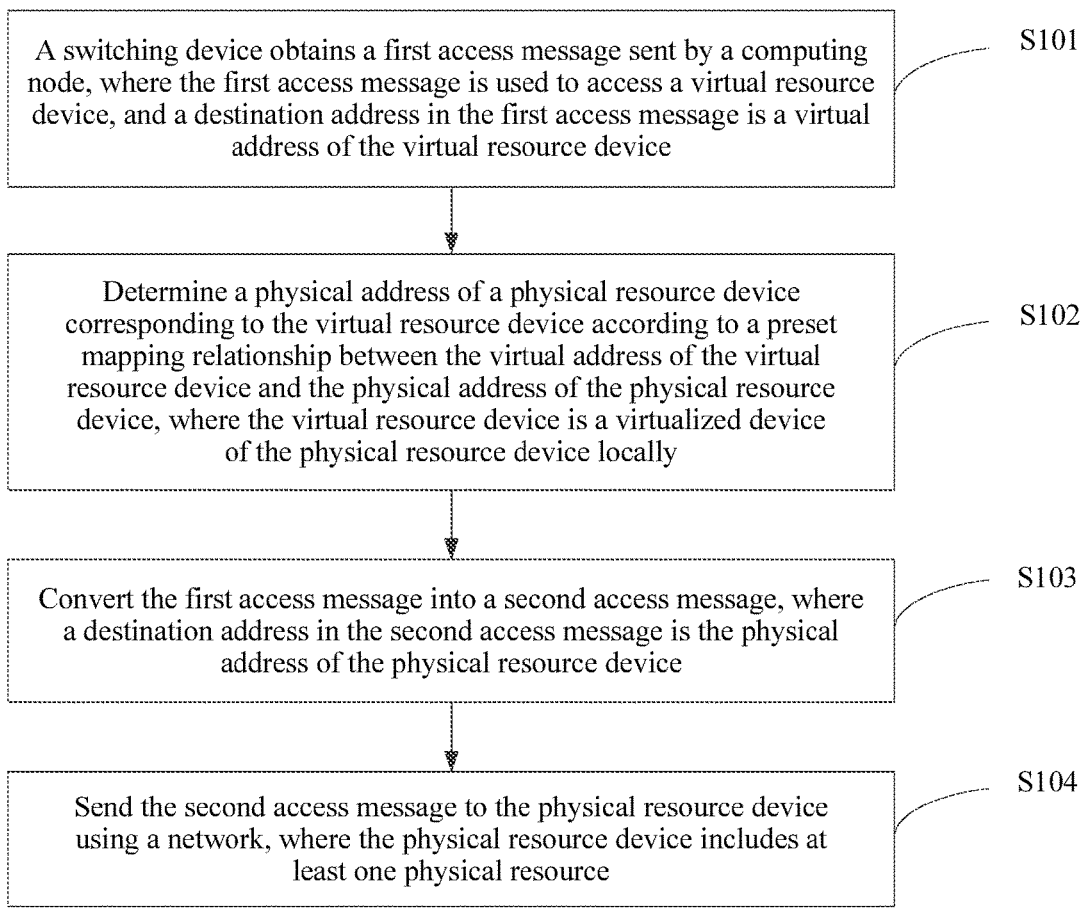
FIG. 1B is a first schematic flowchart of a remote resource access method according to an embodiment of the present disclosure.

The foregoing describes in detail, based on the foregoing application scenario, the remote resource access method provided in this embodiment of the present disclosure. FIG. 1B is a flowchart of a remote resource access method according to an embodiment of the present disclosure. As shown in FIG. 1B, the method includes the following steps.

Step S101: A switching device obtains a first access message sent by a computing node, where the first access message is used to access a virtual resource device, and a destination address in the first access message is a virtual address of the virtual resource device.

Further, step S101 may be implemented using the following method. The computer system directly accesses a virtual device connected to a computer system when the computer system needs to access a remote physical resource device. A computing node of the computer system sends the first access message to the switching device. The first access message has a destination address to which the message is to be transmitted, the message is used to access the virtual resource device, and the destination address in the first access message is the virtual address of the virtual resource device.

Step S102: Determine a physical address of a physical resource device corresponding to the virtual resource device according to a preset mapping relationship between the virtual address of the virtual resource device and the physical address of the physical resource device, where the virtual resource device is a virtualized device of the physical resource device locally.

Further, step S102 may be implemented using the following method. Retrieving a mapping relationship between the virtual address of the virtual resource device and the physical address of the physical resource device by querying an address conversion table in order to determine the physical address of the physical resource device corresponding to the virtual resource device, where the address conversion table stores the mapping relationship between the virtual address and the physical address.

Step S103: Convert the first access message into a second access message, where a destination address in the second access message is the physical address of the physical resource device.

Further, step S103 may be implemented using the following method. The destination address in the first access message is changed to the physical address corresponding to the virtual address in the first access message and of the physical resource device in order to generate the second access message. The destination address in the second access message is the physical address of the foregoing physical resource device, and then the second access message may be further converted into a message in a network format.

Step S104: Send the second access message to the physical resource device using a network, where the physical resource device includes at least one physical resource.

Further, step S104 may be implemented using the following method. The switching device may send the second access message to the physical resource device using an interconnect network after converting the first access message into the second access message. The destination address in the second access message is the physical address of the foregoing physical resource device, and the second access message may be a message in an interconnect network format.

According to the remote resource access method provided in this embodiment of the present disclosure, a virtual address that is of a virtual resource device and that is in a first access message is first converted into a corresponding physical address of a remote physical resource device to generate a second access message, and the second access message is sent to the remote physical resource device corresponding to the physical address using a network such that data transmission between a local computer system and the remote physical resource device can also be implemented without using a driver of the remote physical resource device.

To enable a person skilled in the art to more clearly understand the technical solutions in the embodiments of the present disclosure, the following provides a more detailed embodiment.

Figure 2A:
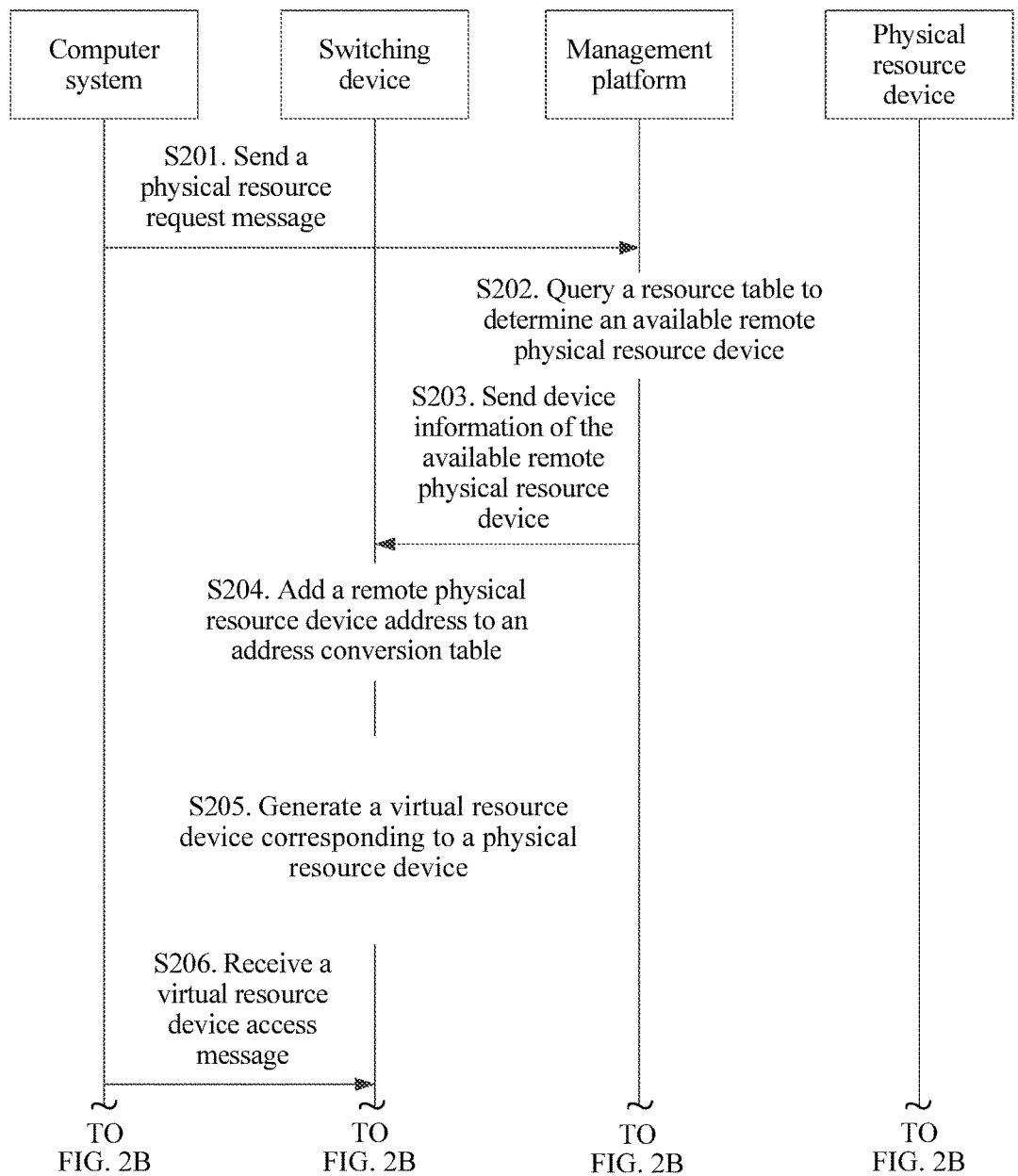
FIG. 2A to FIG. 2B are a second schematic flowchart of a remote resource access method according to an embodiment of the present disclosure.
Figure 2B:
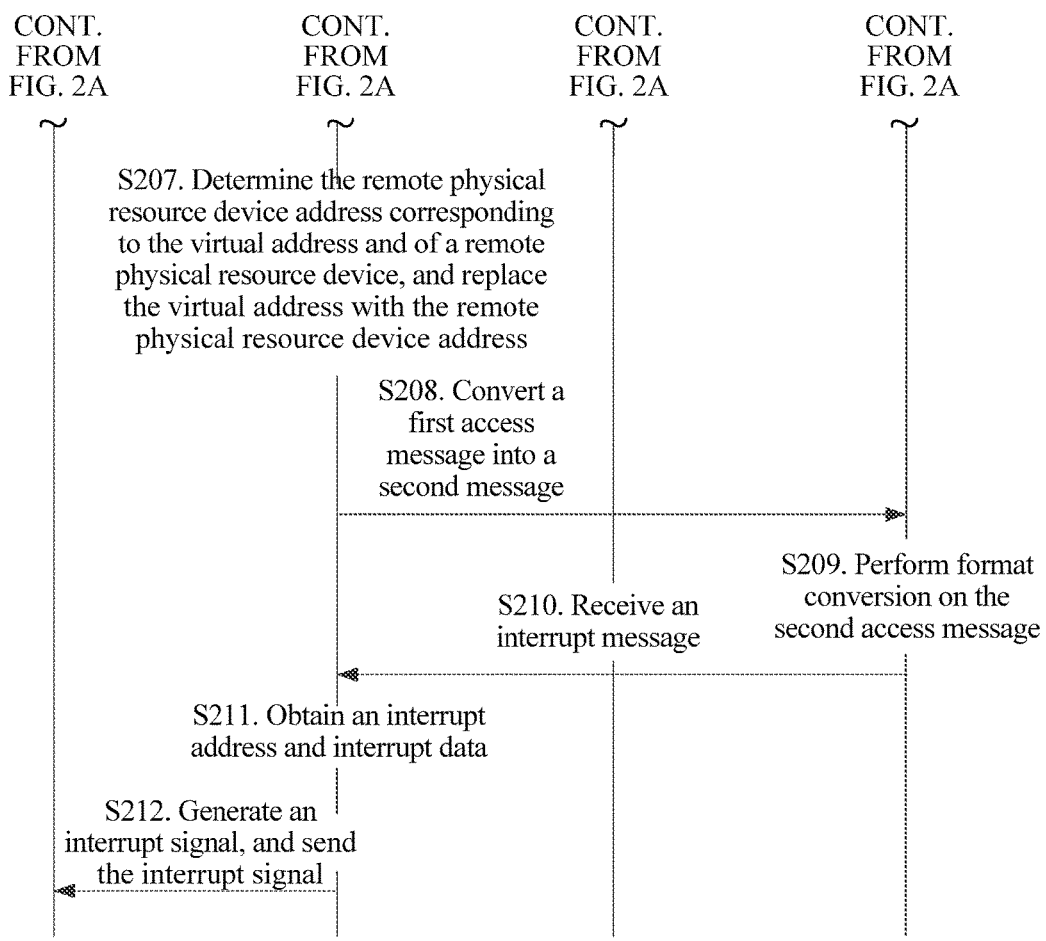

In this embodiment of the present disclosure, the foregoing switching device may be located on one side of the computer system, the physical resource device may be connected to the switching device using the interconnect network, and the switching device may be a relay device between the physical resource device and the computer system. FIG. 2A to FIG. 2B are a flowchart of another method according to an embodiment of the present disclosure. As shown in FIG. 2A and FIG. 2B, the method includes the following steps.

Step S201: A computing node of the computer system sends a physical resource request message to a management platform, where the physical resource request message requests an available physical resource device from the management platform.

Step S202: After receiving the physical resource request message, the management platform queries a resource table to determine an available remote physical resource device, where the resource table stores a state of a remote physical resource device, and the state includes an idle state or a non-idle state.

Further, step S202 may be implemented using the following method. States of all remote physical resource devices may be stored on the management platform; the remote physical resource device sends state information of the remote physical resource device to the management platform when a remote physical resource device is not occupied by any computer system, and the management platform updates a local resource table according to the received state information. The resource table stores a state of a remote physical resource device, and the state includes the idle state or the non-idle state. The remote physical resource device includes the foregoing remote physical resource device and a remote memory device. The remote physical resource device is a hardware device that is not in the same bus architecture as a computer system, and after receiving a physical resource request message sent by a computing unit, the management platform may query the resource table in order to determine remote physical resource devices that are currently available. The management platform determines that the remote physical resource device whose state is idle is available if it is indicated that the state of the remote physical resource device in the resource table is idle.

It should be noted that the management platform may further spontaneously query the resource table. The state of the physical resource device is sent to the switching device if a state of a remote physical resource device in the resource table is idle.

Step S203: The management platform sends physical resource information of the available remote physical resource device to the switching device, where the physical resource information includes a remote physical resource device address of the available remote physical resource device, an access manner, a device type and a programming interface of the available remote physical resource device, and a manufacturer identifier of the available remote physical resource device.

Further, step S203 may be implemented using the following method. The available remote physical resource device may further send the physical resource information of the device to the management platform. The physical resource information may include the remote physical resource device address of the available remote physical resource device, the access manner, the device type and the programming interface of the available remote physical resource device, and the manufacturer identifier of the available remote physical resource device. Because different devices need to be corresponding to different drivers, the management platform sends the physical resource information of the available remote physical resource device to the switching device such that the switching device installs a driver corresponding to the available remote physical resource device according to the physical resource information. The switching device is a relay device that transmits data between the computer system and the remote physical resource device.

Step S204: The switching device receives the remote physical resource device address that is sent by the management platform and that is of the available remote physical resource device, and adds the remote physical resource device address to an address conversion table.

The address conversion table may include a local address of the remote physical resource device on one side of the switching device, and further includes a physical resource device address of the remote physical resource device.

Step S205: The switching device generates a virtual resource device corresponding to a physical resource device.

Further, step S205 may be implemented using the following method. The switching device may fill the received remote physical resource device address into the address conversion table, and received physical resource information is stored in a local cache. Insertion of the physical resource device into the switching device is simulated by performing a slot hot-swap operation, and the slot hot-swap operation is as follows. One vacant slot in the switching device is selected, and a level of a slot sensor corresponding to the slot is set to a high level. The slot sensor notifies, according to the high level, a hot-swap controller that a device is inserted into the slot. The hot-swap controller sets a value of a hot-swap register corresponding to the slot as a preset identifier according to the high level, and the preset identifier is used to indicate that the physical resource device is inserted into the slot. After detecting, by means of polling or using an interrupt manner, that the value of the hot-swap register is the preset identifier, a slot event monitoring thread in a hot-swap driver reads the physical resource information from the local cache. In addition, a device driver corresponding to the physical resource device is selected according to the physical resource information, and the device driver runs in order to simulate, on the switching device, insertion of the physical resource device into the switching device, and generate the virtual resource device corresponding to the physical resource device.

It may be understood that, after the virtual resource device is generated, it is necessary to locally allocate a virtual address to the virtual resource device such that the computing node can access the virtual resource device according to the virtual address. In addition, after a driver of the physical resource device runs, the switching device needs to update a state of the slot to a non-idle state.

After a slot hot-swap operation is completed, the switching device fills a virtual address that is of the virtual resource device and generated at a computer system end into an address conversion table of the switching device such that the virtual address of the virtual resource device corresponds to the previously filled physical resource device address of the remote physical resource device, and the data is transmitted between the remote physical resource device and the computer system.

Step S206: The switching device receives a virtual resource device access message sent by a computer system, the virtual resource device includes virtual hardware created by the computer system, and the virtual resource device access message includes a virtual address of the virtual resource device.

Step S207: The switching device determines, by querying the address conversion table, the physical resource device address corresponding to the virtual address and of the remote physical resource device, and replaces the virtual address with the remote physical resource device address.

Further, step S207 may be implemented using the following method. The switching device queries the address conversion table, and determines, using a mapping relationship in the address conversion table and that is between the virtual address and the remote physical resource device address, the physical resource device address corresponding to the virtual address and of the remote physical resource device, and replaces the virtual address with the remote physical resource device address.

Step S208: The switching device performs format conversion on a first access message of the virtual resource device in order to convert the first access message into a second access message, where a format of the second access message is a message format corresponding to a transmission medium, and sends the second access message to the remote physical resource device over the transmission medium.

Figure 3:
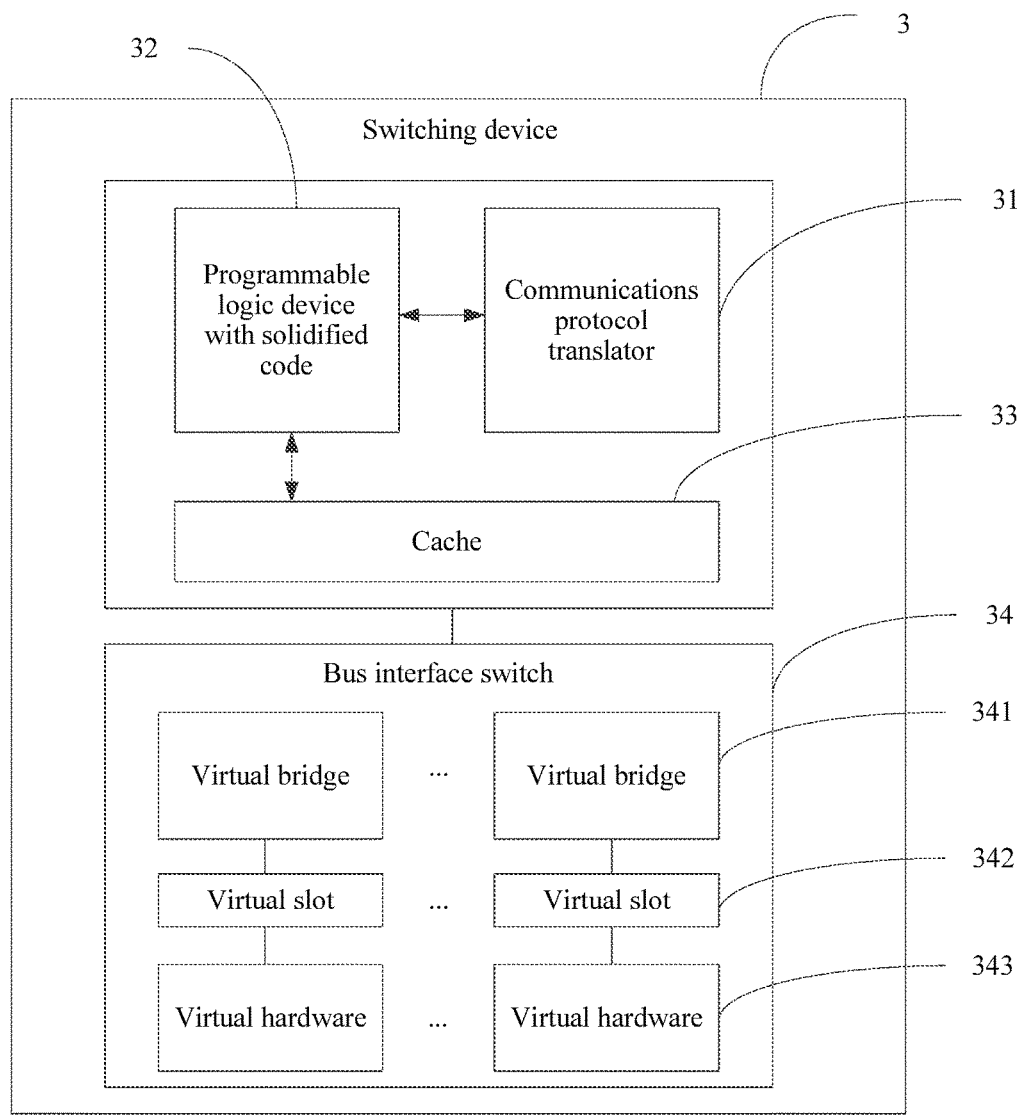
FIG. 3 is a first schematic structural diagram of a switching device according to an embodiment of the present disclosure.

Further, S208 may be implemented using the following method. A structure of a switching device 3 is shown in FIG. 3. The switching device 3 includes a communications protocol translator 31, a programmable logic device 32 with solidified code, a cache 33, and a bus interface switch 34. The bus interface switch 34 includes a virtual bridge 341, a virtual slot 342, and virtual hardware 343. The communications protocol translator 31 may be a standard peripheral component interconnect (PCI) 0 or PCIe device connected to a PCI bus. The programmable logic device 31 includes a segment of solidified code and has a specific control function. The function can be used to detect a corresponding virtual resource device according to a message sent from the interconnect network, generate an interrupt and notify a local CPU of the interrupt, receive and store the physical resource information sent by the management platform, select an available slot, generate a hot-swap event, and send slot information to a local operating system. The physical resource information sent by the management platform is stored in the cache 33 of the switching device 3. The switching device 3 and the remote physical resource device may transmit data using the interconnect network as a transmission medium. Therefore, a converter may be responsible for conversion between a PCIe protocol and an interconnect network protocol, and the communications protocol translator 31 may perform format conversion on the first access message of the foregoing virtual resource device in order to convert the first access message into a second access message in a format of the interconnect network protocol. Then, the second access message in the format of interconnect network protocol is sent to the remote physical resource device.

Step S209: The remote physical resource device receives the second access message sent by the switching device to the remote physical resource device, performs format conversion on the second access message in order to convert the second access message into a third access message in a bus interface format, where the third access message includes the physical resource device address of the remote physical resource device, and sends the third access message to the remote physical resource device corresponding to the physical resource device address.

Figure 4:
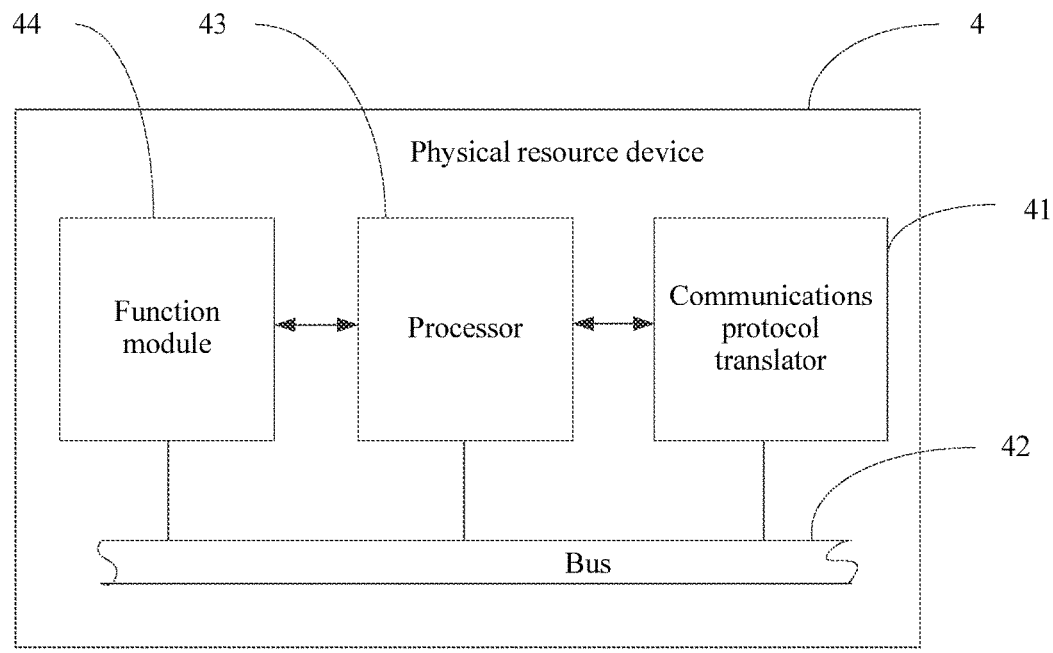
FIG. 4 is a schematic structural diagram of a physical resource device according to an embodiment of the present disclosure.

Further, step S209 may be implemented using the following method. A structure of a physical resource device 4 is shown in FIG. 4. The physical resource device 4 includes a communications protocol translator 41, a bus 42, a processor 43, and a function module 44. The communications protocol translator 41 may be a standard PCI or PCIe device connected to a PCI bus. The switching device and the remote physical resource device 4 may transmit the data using the interconnect network as the transmission medium, the remote physical resource device performs format conversion on the second access message using the communications protocol translator 41 in order to convert the second access message into the third access message. A format of the third access message format is the bus interface format, and the third access message is sent to the remote physical resource device corresponding to the physical resource device address. The remote physical resource device is a hardware device that is not in the same bus architecture as the computer system.

Step S210: The switching device receives an interrupt message sent by the physical resource device, where the interrupt message includes a device address of a device that generates the interrupt message.

Further, step S210 may be implemented using the following method. The remote physical resource device generates the interrupt message when the remote physical resource device needs to access the computer system. The interrupt message may be a message-signaled interrupts (MSI) message, and sends the MSI message to the switching device using an interrupt handler. The MSI message includes the device address of the device that generates the MSI message.

Step S211: The switching device determines, by querying the address conversion table, a virtual address corresponding to the device address and that is of the virtual resource device in order to determine the virtual resource device, and obtains an interrupt address and interrupt data of the virtual resource device, where the address conversion table stores a mapping relationship between the virtual address and the device address.

Further, step S211 may be implemented using the following method. After receiving the MSI message, a remote resource access device queries a local address conversion table, and determines, using the mapping relationship that is in the address conversion table and that is between the virtual address and the device address, a virtual address corresponding to the device address in the MSI message and that is of a local virtual resource device, determines the local virtual resource device corresponding to the virtual address according to the virtual address, and then obtains an MSI address and MSI data of the virtual resource device.

Step S212: The switching device generates an interrupt signal according to the interrupt address and the interrupt data, where the interrupt signal includes the virtual address, and sends the interrupt signal to the computer system.

Further, step S212 may be implemented using the following method After the virtual resource device corresponding to the device that generates the interrupt message is determined, the interrupt address and the interrupt data of the virtual resource device may be obtained, an MSI signal may be generated according to the interrupt address and the interrupt data, and the interrupt signal is sent to the computer system such that a central processing unit in the computer system responds to the interrupt signal and accesses the device that generates the interrupt message. An access process is the same as that in step S205 to step S208.

It should be noted that, when the computer system accesses a memory, the computer system first searches a cache of the switching device for required data. If the required data does not exist in the cache, the computer system needs to access a remote storage device to search for the required data. In this case, a process in which the computer system accesses the remote storage device is the same as the process in which the computer system accesses the remote physical resource device in step S205 to step S208, and details are not described herein again, and after obtaining the required data by accessing the foregoing remote storage device, the computer system stores the required data in the cache of the switching device in order to directly access the cache of the switching device when the data is invoked next time.

According to the remote resource access method provided in this embodiment of the present disclosure, a virtual address that is of a virtual resource device and that is in a first access message is first converted into a corresponding physical address of a remote physical resource device to generate a second access message, and the second access message is sent to the remote physical resource device corresponding to the physical address using a network such that data transmission between a local computer system and the remote physical resource device can also be implemented without using a driver of the remote physical resource device, and access performed by a computing node (such as a CPU) on a physical resource can be implemented using an interrupt manner.

Figure 5:
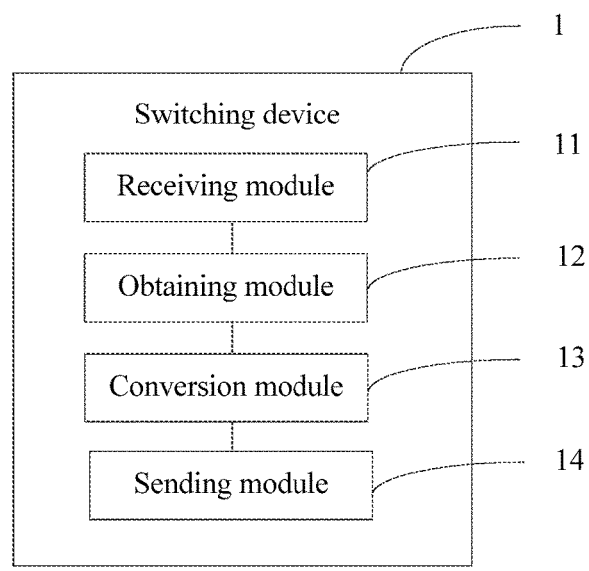
FIG. 5 is a second schematic structural diagram of a switching device according to an embodiment of the present disclosure.

An embodiment of the present disclosure provides a switching device 1. As shown in FIG. 5, the switching device 1 includes a receiving module 11 configured to obtain a first access message sent by a computing node, where the first access message is used to access a virtual resource device, and a destination address in the first access message is a virtual address of the virtual resource device, an obtaining module 12 configured to determine a physical address of a physical resource device corresponding to the virtual resource device according to a preset mapping relationship between the virtual address of the virtual resource device and the physical address of the physical resource device, where the virtual resource device is a virtualized device of the physical resource device locally, a conversion module 13 configured to convert the first access message into a second access message, where a destination address in the second access message is the physical address, and a sending module 14 configured to send the second access message to the physical resource device using a network, where the physical resource device includes at least one physical resource.

Figure 6:
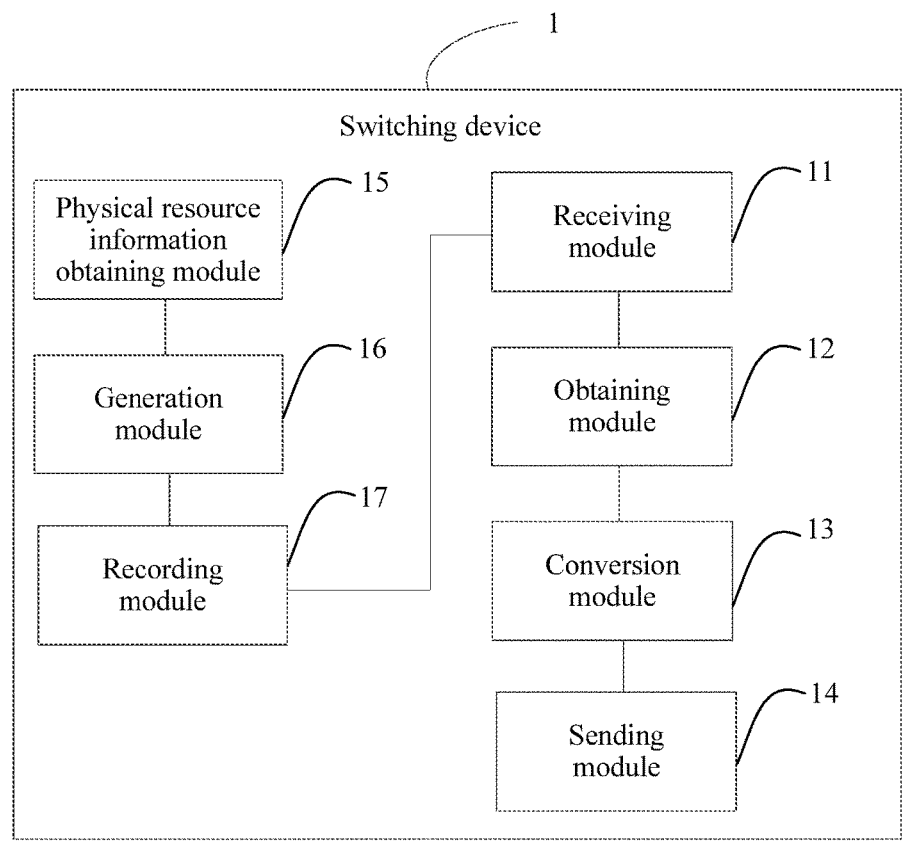
FIG. 6 is a third schematic structural diagram of a switching device according to an embodiment of the present disclosure.

Further, as shown in FIG. 6, the switching device 1 further includes a physical resource information obtaining module 15 configured to obtain physical resource information allocated by a management platform to the computing node, where the physical resource information includes the physical address of the physical resource device, and the management platform is used to manage a physical resource device separate from a computer system, a generation module 16 configured to generate the virtual resource device corresponding to the physical resource device, and a recording module 17 configured to record a mapping relationship between the virtual address of the virtual resource device and the physical address of the physical resource device.

Still further, the receiving module 11 is further configured to obtain a first interrupt request sent by the physical resource device to the computing node, where the first interrupt request carries the physical address of the physical resource device. The obtaining module 12 is further configured to determine the virtual address of the virtual resource device corresponding to the physical resource device according to the preset mapping relationship between the virtual address of the virtual resource device and the physical address of the physical resource device. The conversion module 13 is further configured to convert the first interrupt request into a second interrupt request, where the second interrupt request carries the virtual address of the virtual resource device, and the sending module 14 is further configured to send the second interrupt request to the computing node such that the computing node accesses the virtual resource device according to the second interrupt request.

The generation module 16 is further configured to select a driver of the physical resource device according to the physical resource information, and simulate, on the switching device 1, the physical resource device according to the selected driver in order to generate the virtual resource device corresponding to the physical resource device.

The obtaining module 12 is further configured to retrieve a mapping relationship between the virtual address of the virtual resource device and the physical address of the physical resource device by querying an address conversion table in order to determine the physical address of the physical resource device corresponding to the virtual resource device, where the address conversion table stores the mapping relationship between the virtual address and the physical address.

According to the switching device 1 provided in this embodiment of the present disclosure, a virtual address that is of a virtual resource device and that is in a first access message is first converted into a corresponding physical address of a remote physical resource device to generate a second access message, and the second access message is sent to the remote physical resource device corresponding to the physical address using a network such that data transmission between a local computer system and the remote physical resource device can also be implemented without modifying a driver of the remote physical resource device. In addition, access performed by a computing node (such as a CPU) on a physical resource can be implemented using an interrupt manner.

Figure 7:
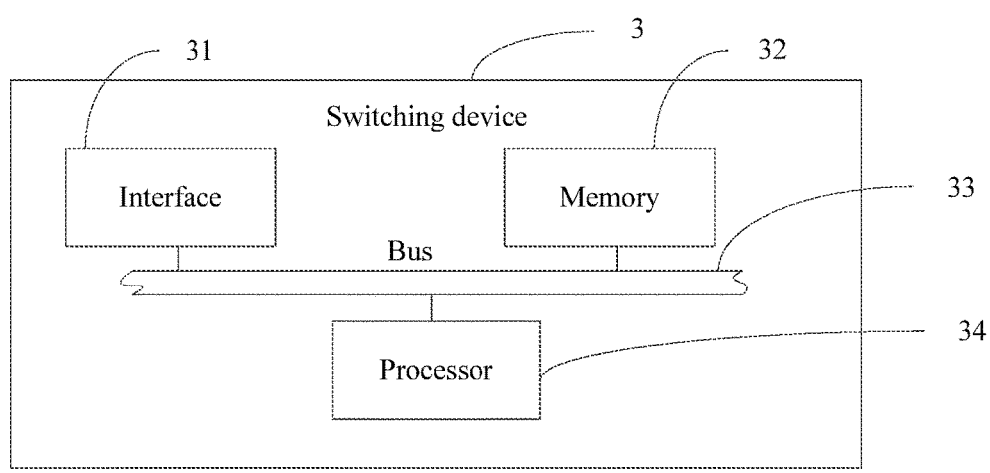
FIG. 7 is a fourth schematic structural diagram of a switching device according to an embodiment of the present disclosure.

An embodiment of the present disclosure provides a switching device 3. As shown in FIG. 7, the switching device 3 includes at least one interface 31, a memory 32, a bus 33, and a processor 34. The memory 32 and the processor 34 are connected using the bus 33, the memory 32 is configured to store an instruction, and the processor 34 is configured to read the instruction to obtain, using the interface 31, a first access message sent by a computing node, where the first access message is used to access a virtual resource device, and a destination address in the first access message is a virtual address of the virtual resource device, determine a physical address of a physical resource device corresponding to the virtual resource device according to a preset mapping relationship between the virtual address of the virtual resource device and the physical address of the physical resource device, where the virtual resource device is a virtualized device of the physical resource device locally, convert the first access message into a second access message, where a destination address in the second access message is the physical address of the physical resource device, and send the second access message to the physical resource device using the interface 31 and a network, where the physical resource device includes at least one physical resource.

Further, the processor 34 reads the instruction to obtain, using the interface 31, a physical resource allocated by a management platform to the computing node, where the physical resource information includes the physical address of the physical resource device, and the management platform is used to manage a physical resource device separate from a computer system, generate the virtual resource device corresponding to the physical resource device, and record a mapping relationship between the virtual address of the virtual resource device and the physical address of the physical resource device.

The processor 34 reads the instruction to obtain, using the interface 31, a first interrupt request sent by the physical resource device to the computing node, where the first interrupt request carries the physical address of the physical resource device, determine the virtual address of the virtual resource device corresponding to the physical resource device according to the preset mapping relationship between the virtual address of the virtual resource device and the physical address of the physical resource device, convert the first interrupt request into a second interrupt request, where the second interrupt request carries the virtual address of the virtual resource device, and send the second interrupt request to the computing node using the interface 31 such that the computing node accesses the virtual resource device according to the second interrupt request.

The processor 34 reads the instruction to select a driver of the physical resource device according to the physical resource information, and simulate, on the switching device 3, the physical resource device according to the selected driver in order to generate the virtual resource device corresponding to the physical resource device.

The processor 34 reads the instruction to retrieve a mapping relationship between the virtual address of the virtual resource device and the physical address of the physical resource device by querying an address conversion table in order to determine the physical address of the physical resource device corresponding to the virtual resource device, where the address conversion table stores the mapping relationship between the virtual address and the physical address.

According to the switching device provided in this embodiment of the present disclosure, a virtual address of a virtual resource device and that is in a first access message is first converted into a corresponding physical address of a remote physical resource device to generate a second access message, and the second access message is sent to the remote physical resource device corresponding to the physical address using a network in order to implement data transmission between a local computer system and the remote physical resource device.

A person of ordinary skill in the art may understand that all or some of the steps of the method embodiments may be implemented by a program instructing relevant hardware. The program may be stored in an non-transitory computer-readable storage medium. When the program runs, the steps of the method embodiments are performed. The foregoing storage medium includes any medium that can store program code, such as a read-only memory (ROM), a random access memory (RAM), a magnetic disk, or an optical disc.

It should be noted that embodiments provided in this application are merely examples. A person skilled in the art may clearly know that, for convenience and conciseness of description, in the foregoing embodiments, the embodiments emphasize different aspects, and for a part not described in detail in one embodiment, reference may be made to relevant description of another embodiment. The embodiments of the present disclosure, claims, and features disclosed in the accompanying drawings may exist independently, or exist in a combination. Features described in a hardware form in the embodiments of the present disclosure may be executed by software, and vice versa. This is not limited herein.

What is claimed is:

1. A remote resource access method, used to access a physical resource device separate from a computer system, the computer system comprising at least one computing node, the computer system and the physical resource device being coupled using a switching device, and the method comprising:
   obtaining, by the switching device, a first access message from a first computing node in the at least one computing node, the first access message accessing a virtual resource device, and a destination address in the first access message being a virtual address of the virtual resource device;
   converting, by the switching device, the first access message into a second access message based on a physical address of the physical resource device corresponding to the virtual address of the virtual resource device, a destination address in the second access message being the physical address of the physical resource device, and the virtual resource device being a virtualized device of the physical resource device;
   sending, by the switching device, the second access message to the physical resource device using a network, the physical resource device comprising at least one physical resource;
   selecting, by the switching device, a device driver according to physical resource information, the physical resource information being received from a management platform and corresponding to the physical resource device; and
   running, by the switching device, the device driver to simulate insertion of the physical resource device into the switching device.

2. The method of claim 1, further comprising:
   obtaining, by the switching device, the physical resource information allocated by the management platform to the first computing node, the physical resource information comprising the physical address of the physical resource device, and the management platform managing the physical resource device separate from the computer system;
   generating, by the switching device, the virtual resource device corresponding to the physical resource device; and
   recording, by the switching device, a mapping relationship between the virtual address of the virtual resource device and the physical address of the physical resource device.

3. The method of claim 1, further comprising:
   obtaining, by the switching device, a first interrupt request from the physical resource device to the first computing node, the first interrupt request comprising the physical address of the physical resource device;
   converting, by the switching device, the first interrupt request into a second interrupt request based on the virtual address of the virtual resource device corresponding to the physical resource device, the second interrupt request comprising the virtual address of the virtual resource device; and
   sending, by the switching device, the second interrupt request to the first computing node to access the virtual resource device according to the second interrupt request.

4. The method of claim 1, further comprising obtaining, by the switching device, the physical address of the physical resource device corresponding to the virtual resource device by querying a mapping relationship between the virtual address of the virtual resource device and the physical address of the physical resource device.

5. A switching device for accessing a physical resource device separate from a computer system, the computer system comprising at least one computing node, the computer system and the physical resource device being coupled using the switching device, and the switching device comprising:
   an interface configured to communicate with the computer system and the physical resource device; and
   a processor coupled to the interface and configured to:
      obtain a first access message from a first computing node in the at least one computing node, the first access message accessing a virtual resource device, and a destination address in the first access message being a virtual address of the virtual resource device;
      convert the first access message into a second access message based on a physical address of the physical resource device corresponding to the virtual address of the virtual resource device, a destination address in the second access message being the physical address of the physical resource device, and the virtual resource device being a virtualized device of the physical resource device;
      send the second access message to the physical resource device using a network, the physical resource device comprising at least one physical resource;
      select a device driver according to physical resource information, the physical resource information being received from a management platform and corresponding to the physical resource device; and
run the device driver on the switching device to simulate insertion of the physical resource device into the switching device.

6. The switching device of claim 5, wherein the processor is further configured to:
obtain the physical resource information allocated by the management platform to the first computing node, the physical resource information comprising the physical address of the physical resource device, and the management platform managing the physical resource device separate from the computer system;
generate the virtual resource device corresponding to the physical resource device; and
record a mapping relationship between the virtual address of the virtual resource device and the physical address of the physical resource device.

7. The switching device of claim 5, wherein the processor is further configured to:
obtain a first interrupt request from the physical resource device to the first computing node, the first interrupt request comprising the physical address of the physical resource device;
convert the first interrupt request into a second interrupt request based on the virtual address of the virtual resource device corresponding to the physical resource device, the second interrupt request comprising the virtual address of the virtual resource device; and
send the second interrupt request to the first computing node to access the virtual resource device according to the second interrupt request.

8. The switching device of claim 5, wherein the processor is further configured to obtain the physical address of the physical resource device corresponding to the virtual resource device by querying a mapping relationship between the virtual address of the virtual resource device and the physical address of the physical resource device.

9. A computing system, comprising:
at least one computing node; and
a switching device coupled to the at least one computing node and configured to:
obtain a first access message from a first computing node in the at least one computing node, the first access message accessing a virtual resource device, and a destination address in the first access message being a virtual address of the virtual resource device;
convert the first access message into a second access message based on a physical address of a physical resource device corresponding to the virtual address of the virtual resource device, a destination address in the second access message being the physical address of the physical resource device, and the virtual resource device being a virtualized device of the physical resource device;
send the second access message to the physical resource device using a network, the physical resource device comprising at least one physical resource;
select a device driver according to physical resource information, the physical resource information being received from a management platform and corresponding to the physical resource device; and
run the device driver on the switching device to simulate insertion of the physical resource device into the switching device.

10. The computing system of claim 9, wherein the switching device is further configured to:
obtain the physical resource information allocated by the management platform to the first computing node, the physical resource information comprising the physical address of the physical resource device, and the management platform managing the physical resource device separate from the computer system;
generate the virtual resource device corresponding to the physical resource device; and
record a mapping relationship between the virtual address of the virtual resource device and the physical address of the physical resource device.

11. The computing system of claim 9, wherein the switching device is further configured to:
obtain a first interrupt request from the physical resource device to the first computing node, the first interrupt request comprising the physical address of the physical resource device;
convert the first interrupt request into a second interrupt request based on the virtual address of the virtual resource device corresponding to the physical resource device, the second interrupt request comprising the virtual address of the virtual resource device; and
send the second interrupt request to the first computing node to access the virtual resource device according to the second interrupt request.

12. The computing system of claim 9, wherein the switching device is further configured to obtain the physical address of the physical resource device corresponding to the virtual resource device by querying a mapping relationship between the virtual address of the virtual resource device and the physical address of the physical resource device.

13. The method of claim 1, wherein the remote physical resource device is a hardware device that is not in a same bus architecture as the computer system, and the computer system does not install and run the device driver.

14. The method of claim 1, wherein the physical resource information comprises an access manner, a device type, a programming interface, and a manufacturer identifier of the physical resource device.

15. The method of claim 1, wherein the management platform comprises state information of remote physical resource devices including the physical resource information, and the management platform determines that the physical resource device is available.

16. The switching device of claim 5, wherein the remote physical resource device is a hardware device that is not in a same bus architecture as the computer system, and the computer system does not install and run the device driver.

17. The switching device of claim 5, wherein the physical resource information comprises an access manner, a device type, a programming interface, and a manufacturer identifier of the physical resource device.

18. The switching device of claim 5, wherein the management platform comprises state information of remote physical resource devices including the physical resource information, and the management platform determines that the physical resource device is available.

19. The computing system of claim 9, wherein the remote physical resource device is a hardware device that is not in a same bus architecture as the computer system, and the computer system does not install and run the device driver.

20. The computing system of claim 9, wherein the physical resource information comprises an access manner, a device type, a programming interface, and a manufacturer identifier of the physical resource device.

* * * * *